Jan. 17, 1961    P. H. ABELSON    2,968,403
SEPARATION OF ISOTOPES BY THERMAL DIFFUSION
Filed Dec. 14, 1943    2 Sheets-Sheet 1
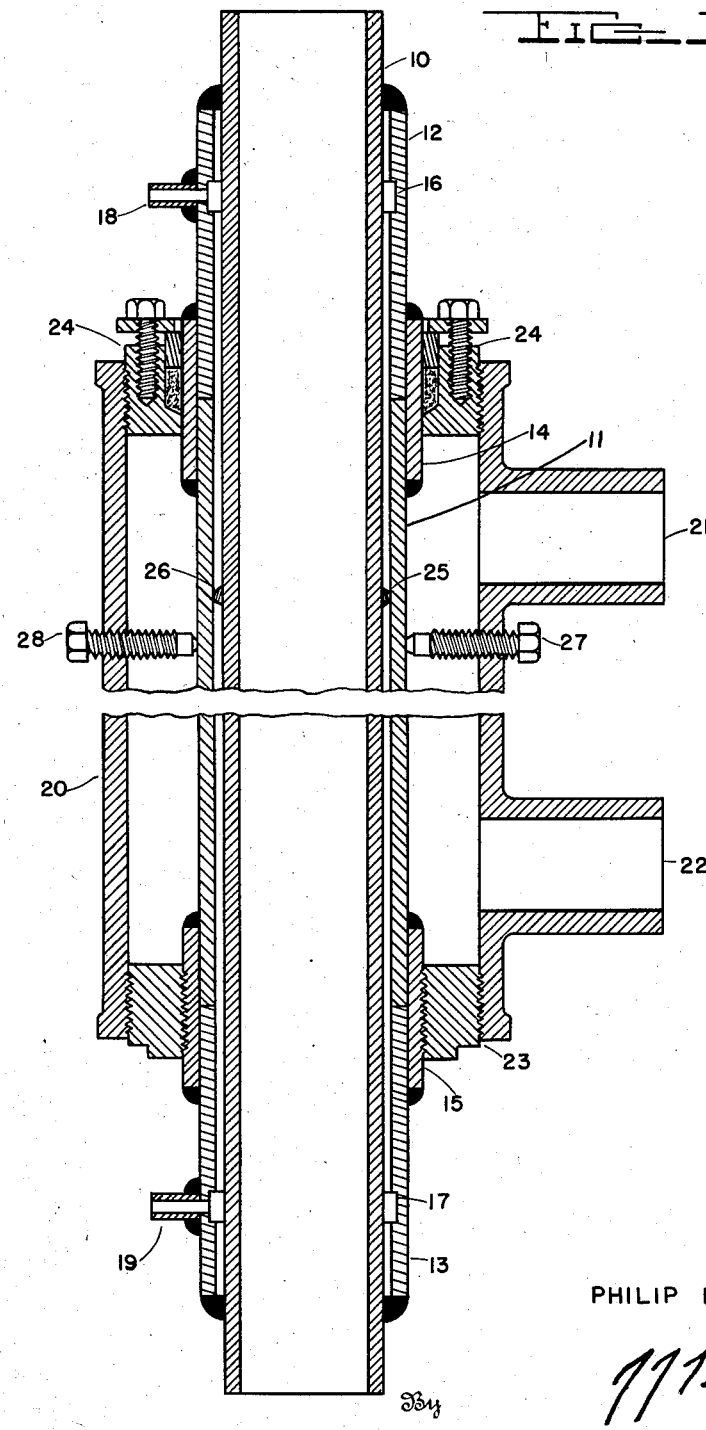
Inventor
PHILIP H. ABELSON Jan. 17, 1961 P. H. ABELSON 2,968,403
SEPARATION OF ISOTOPES BY THERMAL DIFFUSION
Filed Dec. 14, 1943 2 Sheets-Sheet 2
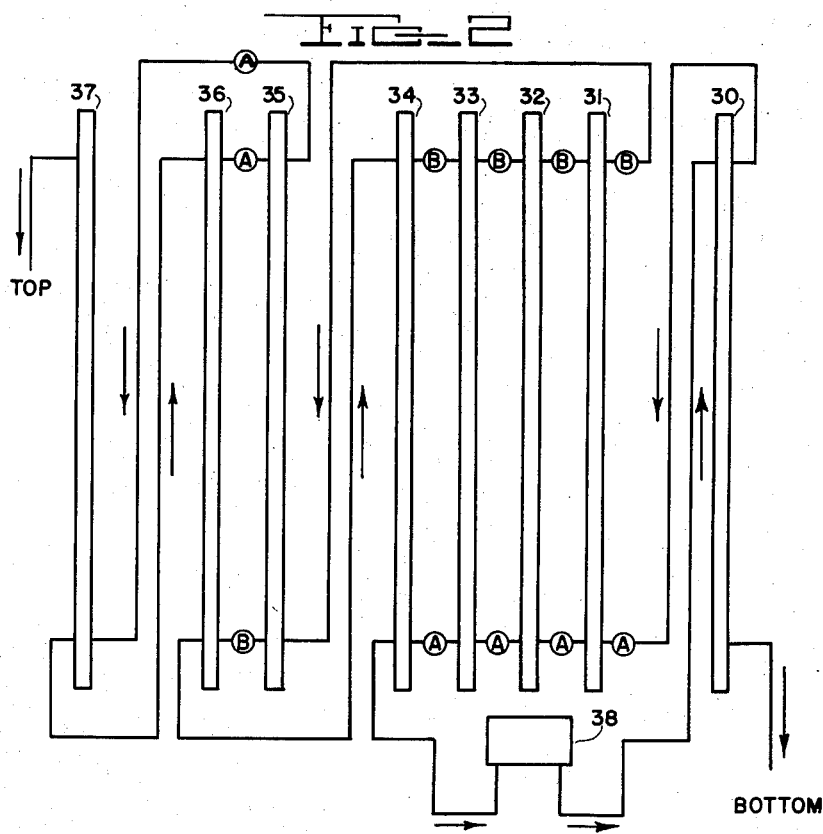
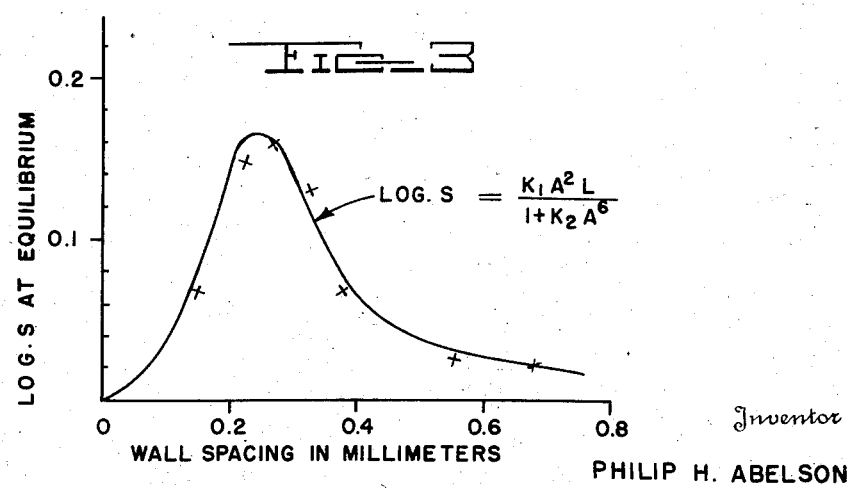
PHILIP H. ABELSON

United States Patent Office 2,968,403
Patented Jan. 17, 1961

2,968,403

SEPARATION OF ISOTOPES BY THERMAL DIFFUSION

Philip H. Abelson, Washington, D.C.

Filed Dec. 14, 1943, Ser. No. 514,259

4 Claims. (Cl. 210—72)

(Granted under Title 35, U.S. Code (1952), sec. 266)

This invention relates to a method and apparatus for the separation of isotopes, and it is particularly directed to the separation of isotopes of uranium.

Of the various methods which have been devised for isotope separation, this invention is concerned with that known as the thermal diffusion method. This method depends for operation on the fact that, in a temperature gradient, the lighter ion or molecule diffuses in the direction of higher temperature. The degree of isotope separation obtained is indicated by a separation factor S which is related to the isotope concentration by the following formula:

$$S = \frac{C_1(1-C_2)}{C_2(1-C_1)}$$

where $C_2$ is the concentration of the lighter isotope in the waste and $C_1$ is the concentration of the lighter isotope in the product of the system.

The thermal diffusion method has been applied successfully to the separation of gases having different molecular weights, including isotopes, but its application to the separation of isotopes in liquid media has heretofore proven impractical. Separation of isotopes of heavy elements has required diffusion of their salts in solution, and this is complicated by extreme changes in the entire salt concentration. For example, using aqueous solutions of zinc sulfate separation factors for the zinc isotopes as high as 1.2 (i.e. 20% separation) have been obtained, but the separation was accompanied by a seven-fold relative change in the salt concentrations of the two fractions. By operating enough separation units in series a separation factor of, say, 2 could be obtained, but the solution containing the lighter isotope would possess only $\frac{1}{2500}$ as much salt as that containing the heavier fraction. Thus, as one attempts to obtain larger isotope separation the yield of separated material reaches the vanishing point. As for the separation of uranium isotopes, special solvents would have to be devised (if they could be made) because water solutions of all uranium salts tend to decompose at the surface of any practical wall materials.

This invention provides a method of separating isotopes, particularly those of uranium, by means of a thermal diffusion process which is practical for large scale operation. With respect to uranium the method includes a preferred embodiment wherein the isotopes are caused to diffuse through a temperature gradient extending from below to above the critical temperature of uranium hexafluoride. The invention also provides a simple and novel apparatus for carrying out the method, which requires very little attention during operation, avoids moving parts in contact with the material being treated and has a very long life in service. In its preferred form the apparatus may be referred to as a diffusion pyramid, as hereinafter described. The separation factors obtainable with this apparatus and method are high in proportion to the size of apparatus employed and the time required to obtain a given degree of separation. The method may be operated continuously or the separation may be conducted in batches.

The method of this invention depends on the discovery that isotopes, particularly those of uranium, may be separated on a large scale by means of thermal diffusion in a liquid medium, provided: (1) that the liquid is itself a single compound of the element whose isotopes are to be separated, and (2) that the distance between the hot and cold walls is kept within certain critical limits, the optimum distance being dependent on the temperatures of the walls and the liquid medium.

The liquid medium suitable for use in this separation process must not be a solution of the element to be separated, or compounds thereof, in some solvent. Rather the liquid must be a single compound of the element itself, that is, a mixture of the same compounds of isotopes of the same element. In this way the concentration of the compound remains constant throughout the separation system, the change in concentration being confined to the isotopes. There are numerous organic and some inorganic compounds of isotopic elements which are liquid at ordinary temperatures or have melting points low enough for use in the process of the invention. Typical compounds which may be used for separation of different isotopes are given in Table 1.

*Table 1*

| Compound: | Isotopic element |
|---|---|
| Carbon tetrachloride | Chlorine. |
| Lead tetraethyl | Lead. |
| Boron trichloride | Boron and chlorine. |
| Germanium tetrachloride | Germanium. |
| Antimony trichloride | Antimony. |
| Chloro-methyl silicane | Silicon. |

In the inorganic class there are many metallic fluorides which either are normally liquid or have low melting points. Among these is uranium hexafluoride and this compound is preferred for use in this invention in connection with the separation of the lighter isotope $U_{235}$. Uranium hexafluoride has rather unique physical properties. It can not be melted at atmospheric pressure because of sublimation. At its melting point of about 64° C. its vapor pressure is about 23 pounds per square inch absolute, and its critical temperature is about 232° C. at a pressure of about 720 p.s.i. The change in volume on freezing is about 33%, the solid being more dense than the liquid. The viscosity of the liquid at 80° C. is approximately 0.7 centipoise. The liquid does not readily conduct electric current, its specific resistance being greater than $10^9$ ohms per cubic centimeter at about 75° C.

In the preferred method of operation the uranium isotopes are caused to diffuse between a "cold" wall maintained just above the melting point and a hot wall maintained above the critical temperature, the pressure on the uranium hexafluoride being high enough so that separation of the material into sharply defined liquid and gas phases does not occur. For hot wall temperatures between about 170° and about 250° C. the wall spacing must be between about 0.05 and 0.4 millimeter, and the optimum spacing is about 0.25 millimeter, especially at a hot wall temperature slightly above the critical temperature.

In order that the invention may be clearly understood it is described in detail with reference to the accompanying drawing, in which:

Fig. 1 is a schematic view of a diffusion column, or unit, of which the apparatus of this invention is made;

Fig. 2 is a schematic diagram of a simple diffusion pyramid employing the column of Fig. 1; and Fig. 3 is a graph of width between hot and cold walls versus separation factor.

Referring to Fig. 1, the diffusion unit shown is particularly designed for the separation of uranium isotopes, although it can equally well be used for the separation of other isotopic elements. The essential difference between this unit and units generally serviceable for separation of any isotopes lies in the particular requirements of wall materials and wall spacing where uranium hexafluoride is to be handled. The diffusion unit comprises an inner tube 10 and an outer tube 11 arranged in vertical position. The tube 10 is made of nickel, or at least has an outer surface of nickel or nickel alloy such as Monel metal or stainless steel of high nickel content, as nickel is the only common metal so far known which will withstand the corrosive action of uranium hexafluoride at high temperature. The outer tube 11 may also be made of nickel, but because it is maintained at a much lower temperature it may safely be made of copper. However, due to heating of the ends of the tube where no forced cooling is provided, the tube 11 is provided with nickel end pieces 12 and 13 held in place by welded sleeves 14 and 15. The end pieces 12 and 13 have annular recessed portions 16 and 17 for collection of material which is withdrawn (or supplied) through conduits 18 and 19. The end pieces 12 and 13 are welded to the tube 10 to provide a tightly sealed annular space between the tubes 10 and 11.

In order to maintain the tube 11 at a substantially constant temperature, a jacket 20 is provided around the tube 11 with openings 21 and 22 for supplying circulating water. The jacket 20 may be supported in any conventional manner. The method shown, however, is simple and satisfactory. As shown, the jacket 20 is fastened at the lower end of the tube 11 by means of a threaded bushing 23 which screws in between the jacket 20 and the sleeve 15, the latter being threaded for this purpose. At the upper end an expansion joint is provided by means of a standard packing gland 24 surrounding the sleeve 14. In this way the sleeve 14 may slide up or down in the gland 24 as the tubes 10 and 11 expand or contract.

In the design shown the tube 10 is maintained at the upper temperature and the tube 11 is cooled. However, with appropriate change of tube materials to avoid corrosion (where necessary), the unit may be operated equally well with the tube 11 heated and the tube 10 cooled. The tube 10 is heated by passage of steam through it. The steam connections, steam traps and other fitments are not shown because their connections are according to conventional practice.

Due to the different coefficients of expansion of nickel and copper, and particularly the different temperatures of the tubes 10 and 11, it would be advisable to provide a standard expansion joint or packing gland similar to the gland 24, between the tubes 10 and 11. However, where uranium hexafluoride is the liquid between the tubes 10 and 11 it is better to avoid all moving joints in contact with the liquid and to weld the tubes 10 and 11 together (as shown) and let them be subject to expansion stresses.

As a result of many runs in units of such design it has been found that the expansion stresses are not so great as to break the tubes 10 and 11 or the welds, even where the tubes are 40 feet long and from three to four inches in diameter. However, it is desirable to provide adequate spacers for maintaining the tubes 10 and 11 properly centered. Spacers between the tubes may consist of small screws placed in holes drilled part way into the tube 10 and tapped, but the quickest method consists in spot welding the spacers in place. They are shown as the spacers 25 and 26 in Fig. 1. The deviation from the desired temperature gradient between the tubes 10 and 11 caused by these spacers (generally placed 4 around the tube 10 every six inches or so) does not appear to have an appreciable adverse effect on the separation of the isotopes. It is also desirable, in units of considerable length, to provide adjustable spacers for centering the tube 11 and providing lateral support. Such spacers are shown as the screws 27 and 28. Ordinarily they are placed three around the jacket 20 and at intervals of ten feet or so. However any other means for providing lateral support for the tube 11 may be used.

In operation the tube 10 is heated with steam and air is blown through the conduit 19 to remove any residual moisture. Then fluorine is passed through the column to form a protective coating of metallic fluoride on the walls of the tubes 10 and 11. After that uranium hexafluoride is passed into the unit until it is full, the temperature of the tube 11 being above 64° C. (the melting point of the hexafluoride) and the tube 10 being at about the desired operating temperature, say 240° C. At this temperature the uranium hexafluoride must be maintained under a pressure of about 1000 p.s.i. because of its high vapor pressure. With the temperature difference between the tubes 10 and 11 the lighter isotope, $U_{235}$, diffuses toward the tube 10 and the heavier isotopes diffuse toward the tube 11. This will continue until the back diffusion due to the concentration gradient balances the separating effect of the thermal diffusion. However a convection current is created by the temperature drop between the walls so that uranium hexafluoride adjacent the tube 10 moves upward and the material next to the tube 11 moves downward. In this way the lighter isotope is concentrated toward the top of the unit and the heavier isotopes collect at the bottom. Since the approach to equilibrium is a negative exponential function with time, it is impractical to concentrate the isotope beyond a certain point, and the time required for a given installation to reach half-equilibrium (for a given separation factor) is selected as a measure of the efficiency of the apparatus.

The reproducibility of results with units, or diffusion columns, of the kind illustrated in Fig. 1 is a characteristic in favor of the method and apparatus of this invention. As a result of extensive investigation some generalizations can be made. Any column that is constructed will give some isotope separation. If the width of the annular space between the hot and cold walls is properly chosen this separation will be fairly large even if the two tubes are not perfectly concentric or even if other gross imperfections are present. Thus, an imperfectly constructed column might have a spacing of 0.20 millimeter on one side and 0.30 millimeter on the other. Yet this column will give an equilibrium separation of 40% to 90% that of a much more carefully constructed unit whose spacing is always close to 0.25 millimeter. At the same time, however, an imperfect column has a larger half-equilibrium time.

A typical test showing reproducibility of these units was conducted in which five units were made as nearly alike as possible. A hot wall temperature of 185° C. and a cold wall temperature of 60° C. were employed) temperatures refer to steam in the tube 10 and water circulating in the jacket 20). The results are shown in Table I, using uranium hexafluoride.

*Table 1*

| Time of run | Separation Factor | | | | | |
|---|---|---|---|---|---|---|
| | Unit 1 | Unit 2 | Unit 3 | Unit 4 | Unit 5 | Average |
| 1.25 days | 1.11 | 1.14 | 1.10 | 1.11 | 1.09 | 1.10 |
| 3.25 days | 1.18 | 1.15 | 1.17 | 1.19 | 1.16 | 1.17 |
| 8.25 days | 1.29 | 1.30 | 1.22 | 1.29 | 1.26 | 1.27 |
| 12.25 days | 1.32 | 1.34 | 1.36 | 1.36 | 1.32 | 1.34 |
| 17.25 days | 1.37 | 1.42 | 1.44 | 1.42 | 1.39 | 1.41 |

Over long periods of time, often exceeding six months operation, these units gave consistent results and showed virtually no wear and no column failure.

With higher temperatures of the tube 10, and hence higher temperature gradients between the walls, the rate of diffusion is increased materially, with the result that the periods for the diffusion units to reach half-equilibrium are shorter. Data collected from runs a high temperature gradients is shown in Table II. In the table, $d$=width of annular space in millimeters, $L$=length of unit in feet, $T_1°$ C.=cold wall temperature (i.e. water temperature), $T_2°$ C.=hot wall temperature (i.e. steam temperature), $W$=weight in grams of uranium hexafluoride in the unit, $MS$=maximum measured separation factor, $CS$=calculated equilibrium separation factor, $CH$=calculated half-time and $EL$=effective length of the unit in feet.

Table II

| Unit No. | d | L | $T_1$ | $T_2$ | W | MS | CS | CH | EL |
|---|---|---|---|---|---|---|---|---|---|
| 6 | .25 | 12 | 61 | 254 | 380 | 1.1 | 1.11 | 5 hrs | 12 |
| 7 | .25 | 12 | 61 | 254 | 380 | 1.07 | 1.07 | | |
| 8 | .23 | 12 | 61 | 286 | 340 | 1.12 | 1.12 | 7.5 days | 12 |
| 9 | .25 | 48 | 65 | 254 | 1,720 | 1.5 | 1.62 | 2.5 days | 40 |
| 9 | .25 | 48 | 65 | 270 | 1,600 | 1.52 | 1.66 | 2.25 days | 40 |
| 9 | .25 | 48 | 60 | 286 | 1,600 | 1.62 | 1.79 | 1.7 days | 38 |
| 10 | .23 | 48 | 61 | 286 | 1,540 | 1.51 | 1.62 | 2 days | 40 |
| 11 | .23 | 48 | 61 | 267 | 1,540 | 1.71 | 1.90 | 5 days | 46 |
| 12 | .20 | 48 | 61 | 259 | 1,340 | 1.79 | 2.23 | 8 days | 41.5 |

An examination of some of the units from which the above data was taken showed them to be not perfect. The last column, labeled "effective length," refers to the fact that the neutral point (i.e. point where $U_{235}$ concentration is 0.71% of some columns was not at the bottom. Figures for the separation are given for the full length as listed in the third column.

Several combinations of units in series and parallel have been run successfully. One combination is shown in Fig. 2 in which eight units of the type shown in Fig. 1 were employed. In the figure, the units, all alike, are designated by the numbers 30 through 37 from bottom to top of the combination. This combination may be called a pyramid because the most units in parallel are at the bottom (with the exception of the single stripping unit 30). Uranium hexafluoride, at a temperature and pressure sufficient to maintain it in the liquid state, is stored in a reservoir 38. The units 30 to 37 are connected as shown by small conduits (e.g. about 1/16 inch I.D.) which are insulated to prevent solidification of the hexafluoride in them. If necessary they may be externally heated as well. After the pyramid has been filled with uranium hexafluoride and diffusion under way, circulation between units is established by opening valves A while maintaining valves B closed, then after a few hours closing valves A and opening valves B. In this way circulation from the top of one bank to the bottom of the next, and vice versa, is accomplished without short circuiting any units by possible convection between units of slightly different temperatures. The valve action was obtained by freezing or melting the hexafluoride in short sections of the conduits, thus avoiding moving parts in contact with the hexafluoride. As shown, transfer of the lighter isotope from the top of one bank to the bottom of the next higher bank is accomplished by complete circulation. The circulation is caused by convection which is set up by maintaining one of the two circulating conduits at a different temperature from the other.

This pyramid was operated for 42 days with no difficulty or interruption. During the period the duties of operating personnel consisted in changing circulation every two hours (i.e. changing the positions of valves A and B), occasionally checking circulating water temperature and removing samples. At the withdrawal rate of 205 grams per day of enriched material the pyramid settled down to the following average separation factors for $U_{235}$. The percent $U_{235}$ in the samples is shown below the respective separation factors.

| Bottom of units 31 to 34 | Bottom of units 35 and 36 | Bottom of unit 37 | Top of unit 37 |
|---|---|---|---|
| 0.94 | 1.09 | 1.23 | 1.30 |
| 0.67% | 0.77% | 0.87% | 0.92% |

The pyramid was not operated under optimum conditions, as the proper rate of withdrawal was about 100 grams per day which would have resulted in a separation factor between top and bottom of close to 1.7 instead of 1.38

$$\left(\text{i.e. } \frac{1.30}{0.94}\right)$$

For large scale production of uranium hexafluoride containing say, 90% of $U_{235}$ instead of the 0.71% normally present, a much larger pyramid than that shown in Fig. 2 would be required. For a separation factor of 1.5 between input and product about 1100 units are needed, the pyramid being formed in stages or banks approximately as follows:

| Stage | Units in parallel | Percent $U_{235}$ of Feed |
|---|---|---|
| 1 | 350 | .71 |
| 2 | 235 | 1.06 |
| 3 | 158 | 1.58 |
| 4 | 107 | 2.36 |
| 5 | 72 | 3.49 |
| 6 | 50 | 5.15 |
| 7 | 35 | 7.53 |
| 8 | 24 | 10.9 |
| 9 | 18 | 15.5 |
| 10 | 13 | 21.6 |
| 11 | 10 | 29.2 |
| 12 | 8 | 38.2 |
| 13 | 6 | 48.1 |
| 14 | 5 | 58.2 |
| 15 | 4 | 67.6 |
| 16 | 3 | 75.8 |
| 17 | 2 | 82.4 |
| 18 | 1 | 87.6 |
| Total Number | 1,101 | Output—91.4% $U_{235}$ |

In addition about 350 units would be required for stripping. This figure would depend on engineering economics.

As has already been indicated, the spacing between the hot and cold walls is critical if practical rates of diffusion are to be obtained. This spacing is dependent only on the temperatures of the hot and cold walls and the material being diffused or treated. For uranium hexafluoride the spacing is within the range of 0.05 to 0.4 millimeter, with 0.25 millimeter optimum, for hot wall temperatures between about 160° C. and about 300° C. and a cold wall temperature near the melting point of the hexafluoride. For other compounds and isotopic elements this spacing may be quite different and must be determined by trial. However the dependence of the separation factor at equilibrium, S, on wall spacing, for fixed wall temperatures, is given by the following formula:

$$\log S = \frac{k_1 a^2 L}{1 + k_2 a^6}$$

where the wall spacing is $a$, the length of the unit is L, and $k_1$ and $k_2$ are constants. This formula, derived from theoretical considerations, fits experimental data with reasonable accuracy, as is shown by Fig. 3. In Fig. 3 the wall spacing has been plotted against the logarithm of the equilibrium separation factor for uranium hexafluoride, for a cold wall temperature of about 64° C. and a hot wall temperature of about 213° C., using a diffusion column about 36 feet long. The crosses represent experimental data and the curve was drawn from the formula, the values of $k_1$ and $k_2$ having been chosen to fit the data. The curve can be checked only approximately, however, where the wall spacing is extremely close.

Thus the experimental determination of the separation factors for two different wall spacings (at fixed temperatures) where a new substance is to be treated permits calculation of the constants $k_1$ and $k_2$ and immediate determination of the optimum wall spacing. It is a curious fact that the wall spacing is not critical for changes in either hot wall temperature nor the temperature drop between the walls (within reasonable limits), so that once the optimum spacing has been determined for a given compound at a particular pair of temperatures, the temperatures may be varied over quite a wide range without causing very much change in the efficiency of the diffusion unit.

It is clear from the foregoing description that isotopes of any element which can be obtained in the form of a liquid at temperatures within which it is desired to operate can be separated by the method, and with the apparatus, of this invention, although the invention is particularly directed to the separation of the $U_{235}$ isotope from uranium.

In the claims and throughout the description the term "simple liquid" refers to a single compound of the mixed isotopes, or the mixed isotopes themselves if liquid under the conditions of operation. What are expressly excluded are solutions of isotope (compound) in solvents The invention described herein may be manufactured and used by or for the Government of the United States of America for governmental purposes without the payment of any royalties thereon or therefor.

I claim:

1. A method of separating isotopes which comprises establishing an isotopic mixture consisting of a single liquid compound in the space between two closely spaced vertical walls, maintaining the walls at different temperatures such that the isotope which is lighter concentrates toward the top and the isotope which is heavier concentrates toward the bottom of the space, the lower temperature wall being above the melting point but below the vaporizing temperature of the compound at the operating pressure to maintain the compound liquid adjacent said wall and the hotter wall being above the critical temperature of the compound, and removing liquid enriched in lighter isotope from between the upper portion of said walls.

2. The method of claim 1 further comprising maintaining the operating pressure at a value where the gas phase density is substantially equivalent to the liquid phase density.

3. The method of claim 1, wherein the isotopic mixture is liquid uranium hexafluoride.

4. The method of claim 2, wherein the isotopic mixture is liquid uranium hexafluoride.

References Cited in the file of this patent

UNITED STATES PATENTS

| | | |
|---|---|---|
| 2,258,594 | Brewer et al. | Oct. 14, 1941 |
| 2,268,134 | Clusius | Dec. 30, 1941 |
| 2,394,357 | Beese | Feb. 5, 1946 |
| 2,583,601 | Schwertz | Jan. 29, 1952 |
| 2,597,907 | Steiner et al. | May 27, 1952 |

OTHER REFERENCES

"Demonstration of Thermal Diffusion in Liquids," Nature, vol. 145, 1940, page 670. (Copy in U.S. Bureau of Standards.)

Chapman: Phil. Mag., vol. 7, pp. 1–16 (1929). (Copy in Scientific Library.)

Clusius et al.: Naturwissenschaften, vol. 27, page 148 (1939).

"Further Development of the Separation Tube Experiment," Clusius and Kowalski, Physico-Chemical Institute at the University of Munich, Die Chemische Fabrik, 13. Jahrg., 1940, Nr. 17, page 304. (Copy in Div. 32.)

"Effect of Gravitational Field on the Thermal Diffusion Separation Method," Journal of Chemical Physics, Farber and Libby, Dept. of Chemistry, Univ. of California, December 1940, vol. 8, pages 965–969. (Copy in Div. 32.)

"The Efficiency of Differently Designed Tubes for the Thermal Separation of Gases and Isotopes," Bromley and Brewer, Bureau of Agricultural Chem. and Eng., U.S. Dept. of Agriculture, pages 390–2. (J.F. 1.)

Translation of article form "Die Noturwissenschaften," No. 33, August 19, 1938, page 546. "A New Process for Gas Dissociation and Isotopic Separation. (Copy in Div. 32.)

Zeitschrift fur Physikalische Chemie 44 Band-Clusius and Dickel, Das Trennrohr. I. pages 399, 409, 432, 435, 437, 443, 459, 464, 462, 463. (Copy in Div. 32.)

"Thermal Diffusion-Separation of Copper and Hydrogen in a Solution of $CuCl_2$ and HCL," Nature, vol. 145, page 670, 1940.